(12) United States Patent
Yamagishi

(10) Patent No.: US 12,554,145 B2
(45) Date of Patent: Feb. 17, 2026

(54) LIGHT DIFFRACTION ELEMENT UNIT, MULTISTAGE LIGHT DIFFRACTION DEVICE, AND MANUFACTURING METHOD FOR MULTISTAGE LIGHT DIFFRACTION DEVICE

(71) Applicant: Fujikura Ltd., Tokyo (JP)

(72) Inventor: Hiroyuki Yamagishi, Chiba (JP)

(73) Assignee: Fujikura Ltd., Tokyo (JP)

( * ) Notice: Subject to any disclaimer, the term of this patent is extended or adjusted under 35 U.S.C. 154(b) by 398 days.

(21) Appl. No.: 18/248,910

(22) PCT Filed: Aug. 18, 2021

(86) PCT No.: PCT/JP2021/030182
§ 371 (c)(1),
(2) Date: Apr. 13, 2023

(87) PCT Pub. No.: WO2022/097347
PCT Pub. Date: May 12, 2022

(65) Prior Publication Data
US 2023/0384608 A1   Nov. 30, 2023

(30) Foreign Application Priority Data
Nov. 6, 2020   (JP) ................. 2020-186055

(51) Int. Cl.
*G02B 27/42*   (2006.01)
(52) U.S. Cl.
CPC .................. *G02B 27/42* (2013.01)
(58) Field of Classification Search
None
See application file for complete search history.

(56) References Cited

U.S. PATENT DOCUMENTS

| | | | |
|---|---|---|---|
| 2010/0282608 A1* | 11/2010 | Srinivasan | B01L 3/502792 204/600 |
| 2017/0276871 A1* | 9/2017 | Iwata | G02B 6/4201 |
| 2018/0108581 A1* | 4/2018 | Awaji | H01L 23/08 |
| 2021/0072438 A1* | 3/2021 | Marchal | G02F 1/1339 |
| 2021/0142170 A1* | 5/2021 | Ozcan | G02B 27/4205 |

FOREIGN PATENT DOCUMENTS

| | | |
|---|---|---|
| JP | 2000-96263 A | 4/2000 |
| JP | 2000-131508 A | 5/2000 |
| JP | 2002-372658 A | 12/2002 |
| WO | 2013027340 A1 | 2/2013 |
| WO | 2019/115606 A1 | 6/2019 |

OTHER PUBLICATIONS

Written Opinion issued in corresponding International Application No. PCT/JP2021/030182 mailed Oct. 12, 2021 (14 pages).
International Search Report issued in corresponding International Application No. PCT/JP2021/030182 mailed Oct. 12, 2021 (2 pages).

* cited by examiner

*Primary Examiner* — Robert E. Tallman
(74) *Attorney, Agent, or Firm* — Osha Bergman Watanabe & Burton LLP

(57) ABSTRACT

A light diffraction element unit includes an optically-transparent substrate; a light diffraction element disposed on a main surface of the optically-transparent substrate; and a three-dimensional alignment mark disposed on the main surface in a vicinity of the light diffraction element and having a thickness greater than a thickness of the light diffraction element.

10 Claims, 4 Drawing Sheets

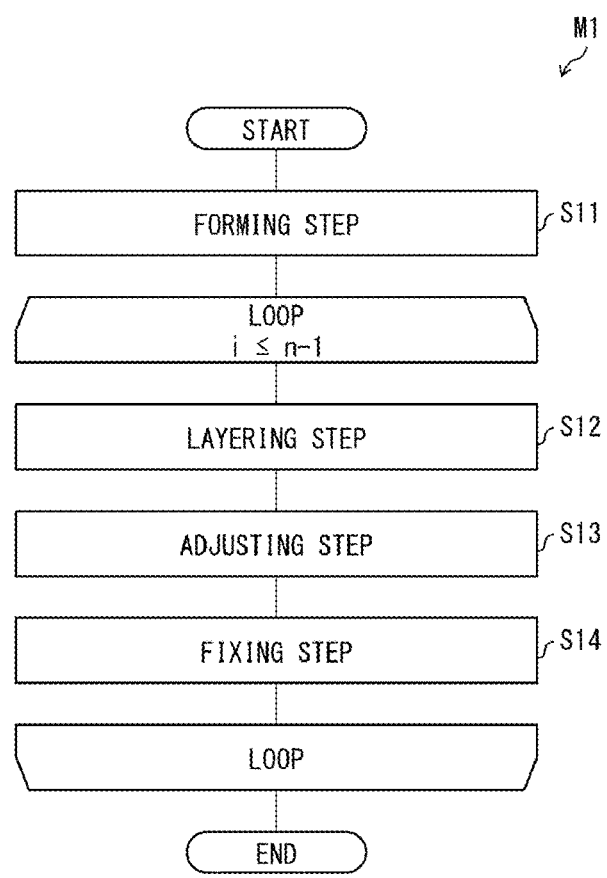

LIGHT DIFFRACTION ELEMENT UNIT, MULTISTAGE LIGHT DIFFRACTION DEVICE, AND MANUFACTURING METHOD FOR MULTISTAGE LIGHT DIFFRACTION DEVICE

BACKGROUND

Technical Field

The present invention relates to a light diffraction element unit including a light diffraction element. The present invention also relates to a multistage light diffraction device including a plurality of light diffraction element units configured as such and to a method for manufacturing the multistage light diffraction device.

Description of the Related Art

Patent Literature 1 discloses a technique according to which a plurality of optical elements including lenses and light diffraction elements are arranged along an optical path of input light so that the plurality of optical elements is layered and these optical elements are caused to act on the input light in sequence. One example of the optical element is a planar light diffraction element that has a fine projection/recess structure and that has a two-dimensional pattern when macroscopically viewed and typically has a thickness of several µm. These light diffraction elements are provided on a main surface of a substrate which is optically transparent. Hereinafter, the light diffraction element and the substrate are referred to as a light diffraction element unit.

In a multistage light diffraction device in which a plurality of light diffraction element units is caused to act on input light in sequence, it is important to adjust the positions and orientations of the light diffraction element units relative to the input light so that the positions and orientations are set at predetermined positions and predetermined orientations. This is because, when the light diffraction element units deviate from the predetermined positions and orientations relative to the input light, the light diffraction element units can hardly exert a desired action on the input light. Adjustment of the positions and orientations of the light diffraction element units relative to the input light is carried out as follows. That is, a light diffraction element unit to be adjusted is caused to move in an in-plane direction of a main surface of a substrate of the light diffraction element unit when the main surface is viewed in plan view. Hereinafter, the adjustment carried out in this manner on each light diffraction element unit will be referred to as "adjustment in an in-plane direction".

One possible method for the adjustment in the in-plane direction can be a method of providing an alignment mark. The alignment mark is provided together with a light diffraction element at a predetermined position on a main surface of each light diffraction element unit on which main surface the light diffraction element is provided. With the configuration in which the substrates are provided with the respective alignment marks, it is possible to use the alignment marks as a sign to carry out the adjustment of the positions and orientations in the in-plane direction of the layered light diffraction element units (for example, see Patent Literature 2).

Patent Literature 2 discloses an alignment mark that can be obtained by patterning a thin film material by photolithography. Thus, the alignment mark is a two-dimensional structure having no structure in its thickness direction, and is identical in thickness (for example, 0.5 µm or 2 µm) to the thin film material that is patterned together with the alignment mark.

PATENT LITERATURE

Patent Literature 1
   International Publication No. WO 2013/027340
Patent Literature 2
   Japanese Patent Application Publication, Tokukai, No. 2000-96263

Incidentally, in the multistage light diffraction device in which the plurality of light diffraction element units are caused to act on input light in sequence, it is required not only to carry out the above-described adjustment in the in-plane direction but also to define intervals between adjacent ones of the light diffraction element units in their layering direction so that the intervals coincide with a predetermined interval (hereinafter, such a predetermined interval will be referred to as a designed interval).

As discussed above, the alignment mark disclosed in Patent Literature 2 assumes the adjustment in the in-plane direction, and does not assume defining the intervals between the adjacent ones of the light diffraction element units in their layering direction so that the intervals coincide with the designed interval.

SUMMARY

One or more embodiments provide a light diffraction element unit with which it is possible not only to carry out adjustment in an in-plane direction but also to define an interval between the light diffraction element unit and another light diffraction element unit adjacent thereto in their layering direction. One or more embodiments provide a multistage light diffraction device including a plurality of light diffraction element units configured as such.

A light diffraction element unit in accordance with one or more embodiments includes: a substrate (an optically-transparent substrate) which is optically transparent; a light diffraction element provided on one main surface of the substrate; and a three-dimensional alignment mark provided on the one main surface and in a vicinity of the light diffraction element, the three-dimensional alignment mark being greater in thickness than the light diffraction element.

A multistage light diffraction device in accordance with one or more embodiments is a multistage light diffraction device including n (n is an integer of not less than 2) light diffraction element units each of which is as recited in one or more embodiments and which are layered. This multistage light diffraction device employs a configuration in which a three-dimensional alignment mark of an i-th (i is an integer of $1 \leq i \leq n-1$) light diffraction element unit is interposed between a substrate of the i-th light diffraction element unit and a substrate of an i+1-th light diffraction element unit.

A method in accordance with one or more embodiments for manufacturing a multistage light diffraction device is method for manufacturing a multistage light diffraction device that includes n (n is an integer of not less than 2) light diffraction element units each of which is as recited in one or more embodiments. This method includes: a first step of layering an i-th (i is an integer of $1 \leq i \leq n-1$) light diffraction element unit and an i+1-th light diffraction element unit such that a three-dimensional alignment mark of the i-th light diffraction element unit is interposed between a substrate of the i-th light diffraction element unit and a substrate of the i+1-th light diffraction element unit; a second step of adjusting a position of the i+1-th light diffraction element unit relative to the i-th light diffraction element unit such that the three-dimensional alignment mark of the i-th light diffraction element unit overlaps a three-dimensional alignment mark of the i+1-th light diffraction element unit; and a third step of fixing the i+1-th light diffraction element unit to the i-th light diffraction element unit.

In accordance with one or more embodiments, it is possible to provide a light diffraction element unit including an alignment mark that enables adjustment in an in-plane direction and definition of an interval between the light diffraction element unit and another light diffraction element unit adjacent to the light diffraction element unit in their layering direction. Further, it is possible to provide a multistage light diffraction device including a plurality of light diffraction element units configured as such.

Figure 1:
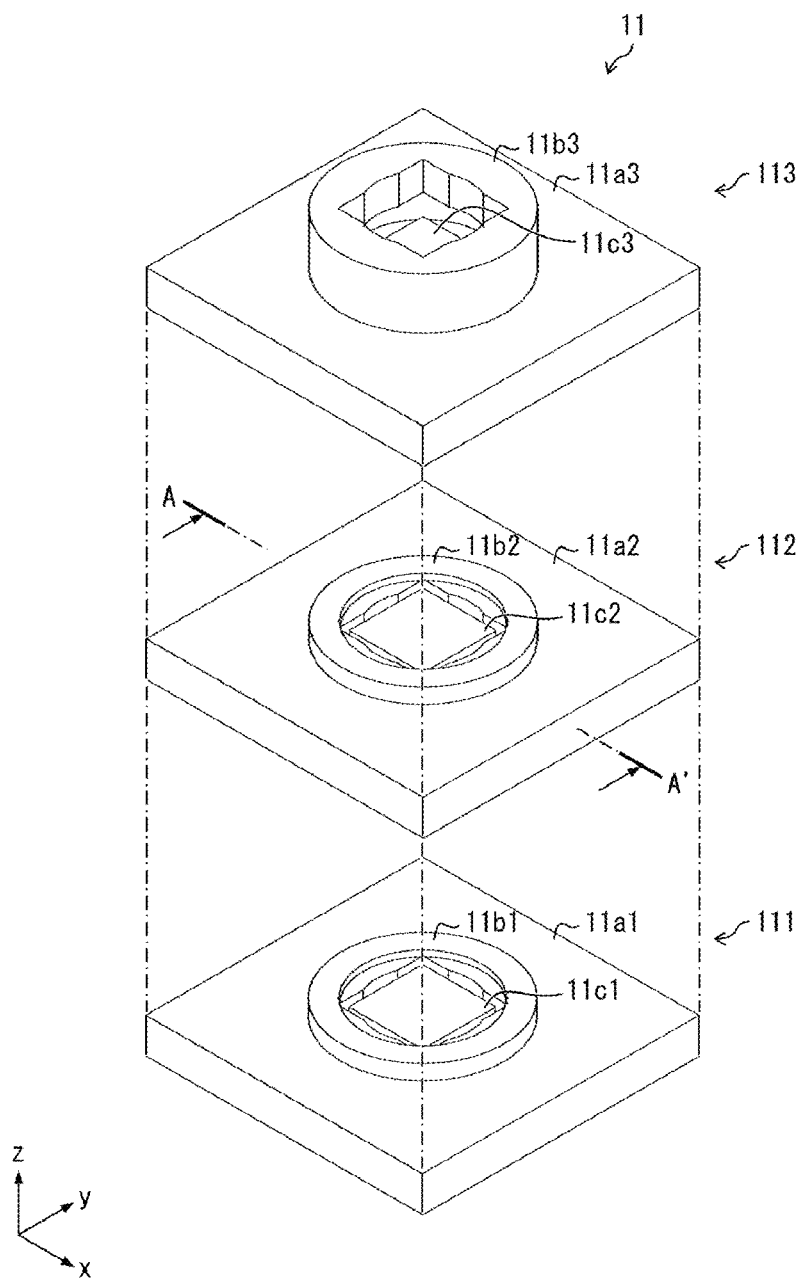
FIG. 1 is an exploded perspective view illustrating three light diffraction element units constituting a multistage light diffraction device in accordance with one or more embodiments.
Figure 2:
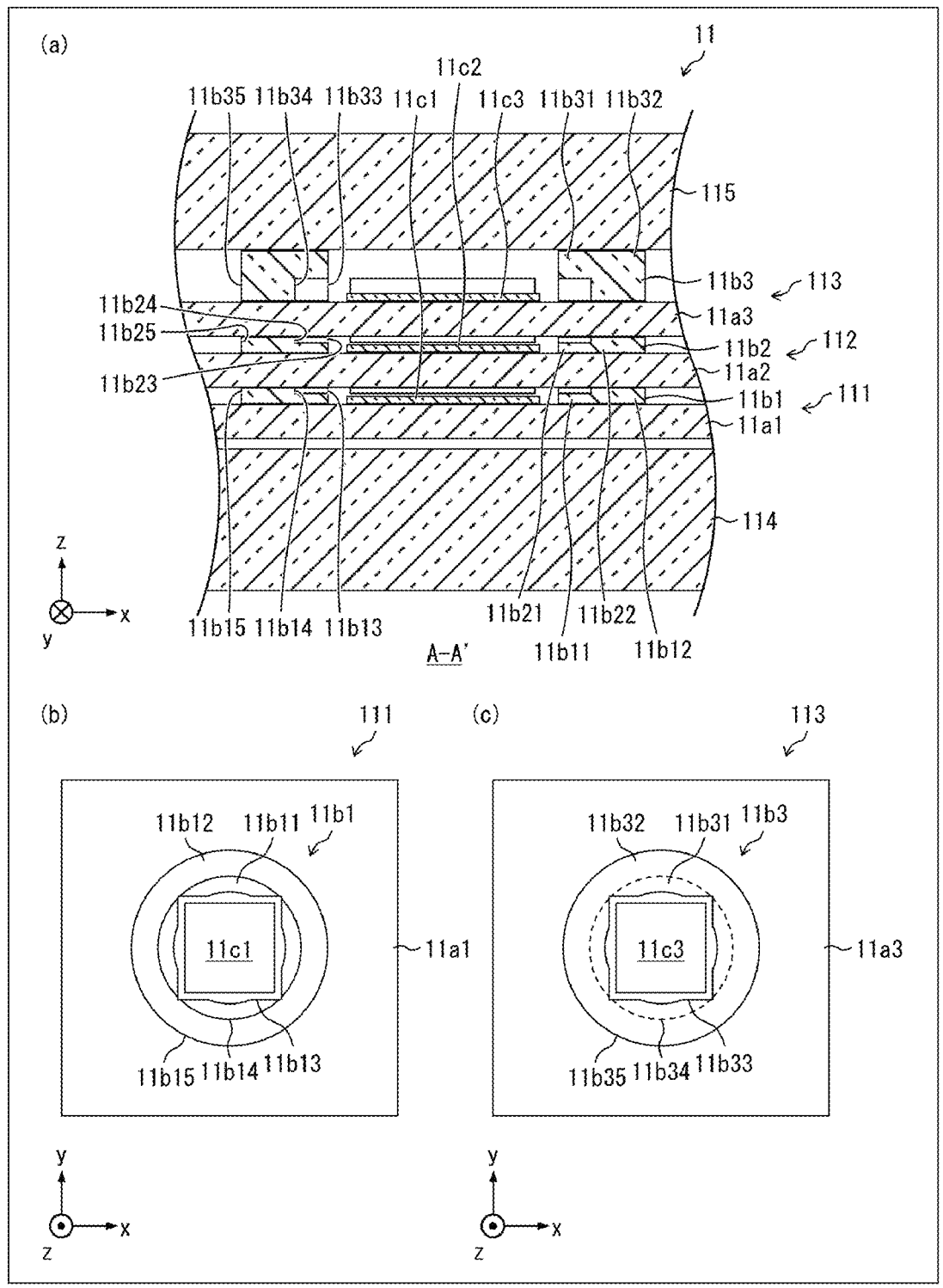

(a) of FIG. 2 is a cross-sectional view of the multistage light diffraction device shown in FIG. 1.

(b) and (c) of FIG. 2 are plan views of the light diffraction element units included in the multistage light diffraction device shown in FIG. 1.

Figure 3:
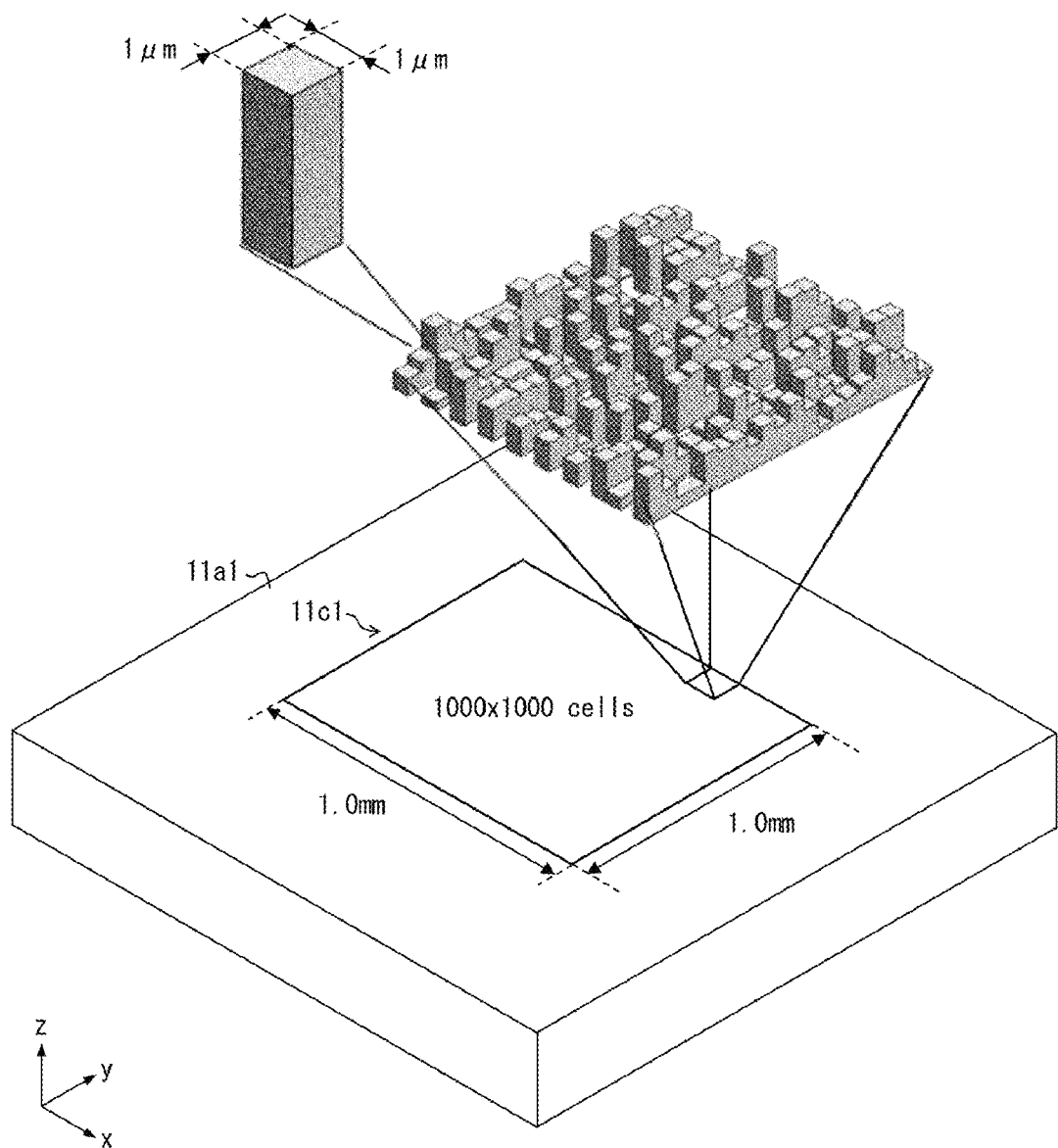

FIG. 3 is a perspective view of one example of the light diffraction element included in the multistage light diffraction device shown in FIG. 1.

FIG. 4 is a flowchart of a method in accordance with one or more embodiments for manufacturing a multistage light diffraction device.

DESCRIPTION OF THE EMBODIMENTS

Example 1

<Configuration of Multistage Light Diffraction Device>

The following description will discuss, with reference to FIGS. 1, 2, and 3, a multistage light diffraction device 11 in accordance with one or more embodiments. FIG. 1 is an exploded perspective view illustrating three light diffraction element units 111 to 113 constituting the multistage light diffraction device 11. (a) of FIG. 2 is a cross-sectional view of the multistage light diffraction device 11, the cross-sectional view illustrating a cross section that is taken along the line A-A' in FIG. 1 and that is in parallel with a z-axis. (b) and (c) of FIG. 2 are respectively plan views of the light diffraction element units 111 and 113 included in the multistage light diffraction device 11. FIG. 3 is a perspective view of a light diffraction element ci, which is one example of a light diffraction element included in the multistage light diffraction device 11.

As shown in FIG. 1, the multistage light diffraction device 11 includes n (n is an integer of not less than 2) light diffraction element units 111, . . . , 11n. In Example 1, n=3. However, n is not limited to 3. Note that, in a case where the light diffraction element units 111 to 113 are not particularly distinguished, each light diffraction element unit will be referred to as a light diffraction element unit $11i$ (i is an integer of $1 \leq i \leq n$).

As shown in (a) of FIG. 2, the multistage light diffraction device 11 includes, in addition to the light diffraction element units 111 to 113, substrates 114 and 115. The substrates 114 and 115 hold the light diffraction element units 111 o 113 in a state in which the light diffraction element units 111 to 113 are sandwiched and fixed between the substrates 114 and 115.

The multistage light diffraction device 11 is constituted by the light diffraction element units 111, 112, and 113 layered in this order. Hereinafter, a direction in which the light diffraction element units 111 to 113 are layered is called a layering direction, and a direction in parallel with a plane that is orthogonal to the layering direction and that is in parallel with main surfaces of substrates 11$a$1 to 11$a$3 of the light diffraction element units 111 to 113 is called an in-plane direction. A layered structure of the light diffraction element units 111 to 113 will be described later with reference to (a) of FIG. 2.

In FIG. 1, a direction extending from the light diffraction element unit 111 toward the light diffraction element unit 113 along the layering direction is defined as a z-axis positive direction. Further, in FIG. 1, an orthogonal coordinate system is defined such that the main surfaces of the substrates 11$a$1 to 11$a$3 are in parallel with an xy-plane and an x-axis and a y-axis are in parallel with corresponding sides of the light diffraction element 11$ci$. The orthogonal coordinate systems shown in (a) to (c) of FIG. 2 and FIG. 3 are defined in a similar manner to the orthogonal coordinate system shown in FIG. 1.

Note that, in Example 1, the light diffraction element unit 111 is identical in configuration to the light diffraction element unit 112. Therefore, FIG. 2 does not show a plan view of the light diffraction element unit 112.

(Configuration of Light Diffraction Element Unit)

As shown in FIG. 1, the light diffraction element unit 11$i$ includes a substrate 11$ai$, an alignment mark 11$bi$, and a light diffraction element 11$ci$.

The substrate 11$ai$ is a plate-like member which is optically transparent. In Example 1, quartz glass is employed as an optically-transparent material of the substrate 11$ai$. Note that the optically-transparent material of the substrate 11$ai$ is not limited to the quartz glass, and can be selected as appropriate from among optically-transparent glass and optically-transparent resins.

In Example 1, the light diffraction element unit 11$i$ is formed so as to have a square shape when viewed from a direction normal to the main surface (for example, the z-axis positive direction). Hereinafter, seeing the light diffraction element unit 11$i$ along a line normal to the main surface is expressed as "seeing the main surface in plan view".

The light diffraction element 11$ci$ is a planar light diffraction element provided to one main surface (in Example 1, a main surface on a z-axis positive direction side) of the substrate 11$ai$. Similarly to the substrate 11$ai$, the light diffraction element 11$ci$ is made of an optically-transparent material. In Example 1, an ultraviolet curable resin is employed as the optically-transparent material of the light diffraction element 11$ci$. A configuration of the light diffraction element 11$ci$ will be described later with reference to FIG. 3.

Similarly to the light diffraction element 11$ci$, the alignment mark 11$bi$, which is one example of the three-dimensional alignment mark, is provided to the one main surface of the substrate 11$ai$. Similarly to the substrate 11$ai$, the alignment mark 11$bi$ is made of an optically-transparent material. In Example 1, the optically-transparent material of the alignment mark 11$bi$ is the ultraviolet curable resin that is identical to the material of the light diffraction element 11$ci$.

The alignment mark 11$bi$ is a three-dimensional structure provided on the one main surface of the substrate 11$ai$ and in the vicinity of the light diffraction element 11$ci$, the three-dimensional structure being greater in thickness than the light diffraction element 11$ci$.

Since the alignment mark 11$bi$ is greater in thickness than the light diffraction element 11$ci$, the alignment mark 11$bi$ functions as a spacer with which an interval a substrate 11$ai$, which is an i-th substrate, and a substrate 11$ai$+1, which is an i+1th substrate, coincides with a designed interval. The designed interval is an interval defined in advance in designing the multistage light diffraction device 11.

As shown in (a) of FIG. 2, the alignment mark 11$b$1 is interposed between the substrate 11$a$1 and the substrate 11$a$2 so as to be in direct contact with the substrate 11$a$1 and the substrate 11$a$2, the alignment mark 11$b$2 is interposed between the substrate 11$a$2 and the substrate 11$a$3 so as to be in direct contact with the substrate 11$a$2 and the substrate 11$a$3, and the alignment mark 11$b$3 is interposed between the substrate 11$a$3 and the later-described substrate 115 so as to be in direct contact with the substrate 11$a$3 and the substrate 115.

When the main surface is viewed in plan view, the alignment mark 11$bi$ has an annular shape continuously surrounding the light diffraction element 11$ci$ (in Example 1, an annular ring shape having an outer edge 11$bi$5 that is in the form of a ring). Note that the alignment mark 11$bi$ may be divided into a plurality of pieces by one or more grooves or slits provided radially. In this case, the alignment mark 11$bi$ has a substantially annular shape intermittently surrounding the light diffraction element 11$ci$.

When the main surface is viewed in plan view, the alignment mark 11$bi$ has, in its center, a void in which the light diffraction element 11$ci$ is housed. When the main surface is viewed in plan view, this void is surrounded by an inner edge 11$bi$3 of the alignment mark 11$bi$. The inner edge 11$bi$3 has a shape obtained by a combination of a square and a circle whose centers coincide with each other. Note that the center of the square means an intersection of two diagonal lines, and can be rephrased as a center of gravity of the square. In Example 1, the circle constituting the void has a diameter longer than a length of one side of the square constituting the void and is shorter than the diagonal line of the square (see (b) and (c) of FIG. 2). Thus, when the main surface is viewed in plan view, the alignment mark 11$bi$ includes a structure constituted by a straight line of the main surface. Note that the void may be configured such that the light diffraction element 11$ci$ is housed therein, and the shape of the void is not limited to the shape obtained by the combination of the square and the circle.

In Example 1, when the main surface is viewed in plan view, the four corners of the square constituting the inner edge 11$bi$3 reach a boundary 11$bi$4 of the alignment mark 11$bi$. Thus, it can be said that the boundary 11$bi$4 also includes the structure constituted by the straight line. Note that the four corners of the square constituting the inner edge 11$bi$3 may not reach the boundary 11$bi$4 and may be included in the boundary 11$bi$4.

As discussed above, when the main surface is viewed in plan view, the alignment mark 11$bi$ is in the form of an annular ring shape. With this, the light diffraction element 11$ci$ is housed in the void of the alignment mark 11$bi$ (see (a) of FIG. 2).

As will be described later with reference to FIG. 4, the alignment mark 11$bi$ can be used as a sign to carry out the adjustment of the position and the orientation in the in-plane direction of the i+1-th light diffraction element unit 11$i$+1 relative to the i-th light diffraction element unit 11$i$. In order to define the orientation of the light diffraction element unit 11$i$+1 relative to the light diffraction element unit 11$i$, the alignment mark 11$bi$ preferably includes a structure constituted by a straight line when the main surface is viewed in plan view. As shown in (b) and (c) of FIG. 2, when viewed in plan view, the shape of the alignment mark 11$bi$ is defined by the inner edge 11$bi$3, the boundary 11$bi$4, and the outer edge 11$bi$5. In the alignment mark 11$bi$ of Example 1, the outer edge 11$bi$5 is in the form of an isotopic ring, but the inner edge 11$bi$3 and the boundary 11$bi$4 each have a shape obtained by a combination of a square and a circle. Thus, the alignment mark 11$bi$ of Example 1 includes a structure constituted by a straight line.

Note that the structure of the alignment mark 11$bi$ is not limited to a structure that enables determination of whether or not the orientations of adjacent light diffraction element units (for example, the light diffraction element units 11$i$ and 11$i$+1) coincide with each other. Alternatively, for example, the alignment mark 11$bi$ may be configured to include an inner edge 11$bi$3, a boundary 11$bi$4, and an outer edge 11$bi$5 each of which is in the form of a circle and which are concentric with each other.

As shown in (a) of FIG. 2, the alignment mark 11$bi$ is constituted by a thick part 11$bi$2 that has a maximum thickness and a thin part 11$bi$1 that is smaller in thickness than the thick part. In Example 1, the thick part 11$bi$2 is provided so as to continuously surround the light diffraction element 11$ci$, whereas the thick part 11$bi$1 is provided inward of the thick part 11$bi$2 so as to extend along the thick part 11$bi$2 (see (b) and (c) of FIG. 2).

In Example 1, the thickness of the thin part 11$bi$1 and the thickness of the thick part 11$bi$2 change from each other discontinuously. Thus, a step exists at the boundary 11$bi$4 between the thin part 11$bi$1 and the thick part 11$bi$2 (see (b) and (c) of FIG. 2).

In the multistage light diffraction device 11, when the main surface of the substrate 11$ai$ of any light diffraction element unit 11$i$ among the light diffraction element units 111 to 113 is viewed in plan view, the light diffraction element units 111 to 113 are fixed with use of an ultraviolet curable resin so that the alignment marks 11$bi$ of the light diffraction element units 11$i$ overlap each other. Note that the fixing method for fixing the relative positions of the light diffraction element units 111 to 113 may be any photocurable resin, and is not limited to the ultraviolet curable resin. The fixing method can be selected as appropriate.

Note that the state in which the alignment marks 11$bi$ overlap each other means a state in which the shape of the alignment mark 11$bi$ of the i-th light diffraction element unit 11$bi$ substantially match the shape of the alignment mark 11$bi$+1 of the i+1-th light diffraction element unit when viewed in plan view. When viewed in plan view, the shape of the alignment mark 11$bi$ is defined by the inner edge 11$bi$3, the boundary 11$bi$4, and the outer edge 11$bi$5.

As discussed above, in the multistage light diffraction device 11 in which the light diffraction element units 111 to 113 are layered, (1) the void in which the light diffraction element 11$c$1 is housed is tightly closed by the substrate 11$a$1, the substrate 11$a$2, and the alignment mark 11$b$1, (2) the void in which the light diffraction element 11$c$2 is housed is tightly closed by the substrate 11$a$2, the substrate 11$a$3, and the alignment mark 11$b$2, and (3) the void in which the light diffraction element 11$c$3 is housed is tightly closed by the substrate 11$a$3, the substrate 115, and the alignment mark 11$b$3.

In Example 1, these tightly-closed voids are filled with dry air, which is one example of a gas. The light diffraction elements 11ci may possibly be deteriorated with age (e.g., hydrolyzed) by moisture contained in the air. By filling, with the dry air, the voids in which the light diffraction elements 11ci are housed and tightly closing the voids, it is possible to protect the light diffraction elements 11ci from a foreign matter (including moisture).

However, from the viewpoint of suppressing oxidation by oxygen, the gas to be filled in the tightly-closed voids is preferably dry nitrogen. However, the gas is not limited to the dry air or dry nitrogen, and may be selected as appropriate. Note that a pressure of the gas to be filled in the tightly closed voids can be selected as appropriate. The pressure may be equal to an atmospheric pressure, lower than the atmospheric pressure, or higher than the atmospheric pressure.

Alternatively, the tightly-closed voids may be filled with an optically-transparent liquid, in place of the gas. One example of the optically-transparent liquid can be oil. The type of the oil is not particularly limited. However, silicone-based oil or paraffin-based oil is excellent in terms of stability and availability. Further, selecting the type of the oil as appropriate can make a refractive index of the oil closer to a desired value. Thus, (i) a refractive index difference between the light diffraction element 11ci and oil being in contact with the light diffraction element 11ci and (ii) a refractive index difference between the oil and the substrate 11ai or 115 can be made closer to refractive index differences defined at the time of the design.

(Configuration of Light Diffraction Element)

As shown in FIG. 3, the light diffraction element 11ci is a planar light diffraction element and is constituted by a plurality of microcells that have respective thicknesses or refractive indices set independently of each other. Note here that the term "microcell" refers to, for example, a cell having a cell size of less than 10 μm. The term "cell size" refers to a square root of an area of a cell. For example, in a case where a microcell has a square shape in a plan view, the cell size is a length of one side of the cell. The cell size has a lower limit that is not particularly limited and can be, for example, 1 nm. The thickness of the light diffraction element 11ci (i.e., a maximum thickness of the thicknesses of the microcells) has a lower limit that is not particularly limited and can typically be several μm.

The above-described plurality of microcells is formed in an effective region of the substrate 11ai. In Example 1, the effective region of the substrate 11ai is in the form of a 1.0 mm square, and is constituted by 1000×1000 microcells arranged in a matrix. Each microcell is constituted by a pillar that is formed on a base having a thickness of 100 μm and that has a bottom having a 1 μm side. Each pillar has a height of, for example, 0 nm, 100 nm, 200 nm, . . . , 1100 nm, or 1200 nm (13 levels in units of 100 nm). The height of the pillar is set so that the microcell constituted by the pillar has a desired refractive index.

In Example 1, the light diffraction element 11ci includes the pillars each having a size of 1 μm. However, this is not limitative. That is, the light diffraction element 11ci may include the pillars each having a size of less than 10 μm. The number of cells and the effective region size of the light diffraction element 11ci may be arbitrarily set.

The multistage light diffraction device 11 is designed so as to allow rays of light transmitted through the microcells (mainly, at least one of visible light and infrared light is assumed) to interfere with each other so that predetermined optical computing is executed. In a case where these light diffraction elements 11ci are arranged and optical computing is executed N times in sequence, it is important to maintain a relative positional relation between the substrates 11a1, 11a2, and 11a3 to desired one.

In the multistage light diffraction device 11, the alignment marks 11bi can be used as a sign to carry out the adjustment of the layered light diffraction element units 11i in the in-plane direction. Note that the method for the adjustment in the in-plane direction will be described later with reference to FIG. 4. In the multistage light diffraction device 11, setting the thickness of the alignment mark 11bi so as to substantially coincide with the designed interval makes it possible to make an interval between adjacent ones of the light diffraction element units in their layering direction substantially coincide with the designed interval. Thus, with the multistage light diffraction device 11, it is possible to use the alignment mark 11bi not only to carry out the adjustment in the in-plane direction but also to define an interval between adjacent ones of the light diffraction element units in their layering direction.

Example 2

The following description will discuss, with reference to FIG. 4, a manufacturing method M1 of a multistage light diffraction device in accordance with one or more embodiments. The description in Example 2 will discuss the manufacturing method M1 by taking, as an example, a case where the multistage light diffraction device 11 described in Example 1 is manufactured. FIG. 4 is a flowchart of the manufacturing method M1. Note that a configuration of a part of the multistage light diffraction device 11 described in Example 1 will not be explained here.

As shown in FIG. 4, the manufacturing method M1 includes a forming step S11, a layering step S12, an adjusting step S13, and a fixing step S14.

<Forming Step>

The forming step S11 is a step of forming the alignment mark 11bi and the light diffraction element 11ci on the effective region on the one main surface of the substrate 11ai. In Example 2, the alignment mark 11bi and the light diffraction element 11ci are formed by stereolithography in the following manner. By carrying out the forming step S11, it is possible to manufacture the light diffraction element units 111 to 113 (see FIG. 1).

First, a layer of an ultraviolet curable resin which is not cured yet is formed on the one main surface of the substrate 11ai so as to be in direct contact with the one main surface. Then, in the effective region, given regions corresponding to their respective pillars are irradiated with ultraviolet laser beams having given strengths and given pulse widths given numbers of times, whereby the light diffraction element 11ci (see FIG. 3) is formed. Further, a given region surrounding the effective region is irradiated with an ultraviolet laser beam, whereby the alignment mark 11bi (see FIG. 1) is formed.

In Example 2, the same ultraviolet curable resin is used to form the alignment mark 11bi and the light diffraction elements 11ci. Thus, the alignment mark 11bi and the light diffraction elements 11ci are made of the same material.

In Example 2, a single stereolithography process is used to form the alignment mark 11bi and the light diffraction element 11ci in a batch without distinction between the alignment mark 11bi and the light diffraction element 11ci. This can avoid a phenomenon that the coordinate system used in the stereolithography is reset between a stereolithography process for forming the alignment mark 11bi and a stereolithography process for forming the light diffraction element 11*ci*. If the coordinate system is reset, the coordinate system deviates randomly before and after the resetting. Consequently, the relative positions of the alignment mark 11*bi* and the light diffraction element 11*ci* vary depending on the light diffraction element unit 11*i*. As a result, it is impossible to use the alignment mark 11*bi* as a sign to carry out the adjustment of the positions in the in-plane direction. With the configuration in which the alignment mark 11*bi* and the light diffraction element 11*ci* are formed in a batch, it is possible to make the relative positions of the alignment mark 11*bi* and the light diffraction element 11*ci* in the light diffraction element units 11*i* coincide with each other.

<Repeating Step>

The layering step S12, the adjusting step S13, and the fixing step S14 are examples of the first step, the second step, and the third step recited in the claims, respectively. The layering step S12, the adjusting step S13, and the fixing step S14 are repeated, provided that $i \leq n-1$. In the multistage light diffraction device 11, n=3. In Example 2, the layering step S12, the adjusting step S13, and the fixing step S14 are carried out twice.

(Layering Step)

The layering step S12 is a step of layering the i-th (i is an integer of $1 \leq i \leq n-1$) light diffraction element unit 11*i* and the i+1-th light diffraction element unit 11*i*+1. In the layering step S12, the light diffraction element units 11*i* and 11*i*+1 are layered such that the alignment mark 11*bi* of the i-th light diffraction element unit 11*i* is interposed between the substrate 11*ai* of the light diffraction element unit 11*i* and the substrate 11*ai*+1 of the light diffraction element unit 11*i*+1. As a result of carrying out the layering step S12, an interval between the substrates 11*ai* and 11*ai*+1 substantially coincides with the designed interval.

(Adjusting Step)

The adjusting step S13 is a step of carrying out the adjustment of the light diffraction element units 11*i* and the i+1-th light diffraction element unit 11*i*+1 in the in-plane direction. Specifically, the position and orientation of the i+1-th light diffraction element unit relative to the i-th light diffraction element unit 11*i* are adjusted such that the alignment mark 11*bi* of the i-th light diffraction element unit 11*i* and the alignment mark 11*bi*+1 of the i+1-th light diffraction element unit 11*i*+1 overlap each other.

The adjustment of the position of the i+1-th light diffraction element unit 11*i*+1 relative to the i-th light diffraction element unit 11*i* can be carried out by using, as a sign, the outer edges 11*bi*5 and 11*bi*+15 and the boundaries 11*bi*4 and 11*bi*+14 of the alignment marks 11*bi* and 11*bi*+1. The adjustment of the orientation in the in-plane direction of the i+1-th light diffraction element unit 11*i*+1 relative to the i-th light diffraction element unit 11*i* can be carried out by using, as a sign, the inner edges 11*bi*3 and 11*bi*+13 of the alignment marks 11*bi* and 11*bi*+1.

The adjusting step S13 may be carried out by a manufacturer of the multistage light diffraction device. In this case, the manufacturer may carry out the adjusting step S13 while seeing a microscopic image. Alternatively, the adjusting step S13 may be carried out by an adjusting device configured to automatically adjust the position in the in-plane direction.

(Fixing Step)

The fixing step S14 is a step of fixing the light diffraction element unit 11*i*+1 to the light diffraction element unit 11*i*. In Example 2, the alignment mark 11*bi* of the light diffraction element unit 11*i*, which is in contact with 11*ai*+1 of the light diffraction element unit 11*i*+1, is bonded to 11*ai*+1 of the light diffraction element unit 11*i*+1 with use of an ultraviolet curable resin. Note that the light diffraction element unit 11*i*+1 may be directly fixed to the light diffraction element unit 11*i* or may be indirectly fixed to the light diffraction element unit 11*i* via another member. One example of the another member can be a tubular member in which the layered light diffraction element units 111 to 113 are housed. A transverse cross-sectional shape of the tubular member may be set in accordance with the shape of the substrate 11*ai* viewed in plan view.

(Other Steps)

Note that, in a case where the void in which the light diffraction element 11*ci* is to be housed is filled with a liquid such as oil, a step of filling the void with the oil may be added between the adjusting step S13 and the fixing step S14.

The multistage light diffraction device 11 includes the substrate 115 configured to tightly close the void in which the light diffraction element 11*c*3 of the light diffraction element unit 113 is housed. In this case, after the layering step S12, the adjusting step S13, and the fixing step S14 are repeatedly carried out, a step of layering the substrate 11*a*3 of the light diffraction element unit 113 and the substrate 115 and a step of fixing the substrate 115 to the light diffraction element unit 113 are carried out. In Example 2, the substrates 11*a*3 and 115 are layered such that the alignment mark 11*b*3 is interposed therebetween. The substrate 115 is fixed to the alignment mark 11*b*3.

Aspects of one or more embodiments can also be expressed as follows:

A light diffraction element unit in accordance with a first aspect of one or more embodiments includes: a substrate which is optically transparent; a light diffraction element provided on one main surface of the substrate; and a three-dimensional alignment mark provided on the one main surface and in a vicinity of the light diffraction element, the three-dimensional alignment mark being greater in thickness than the light diffraction element.

In configuring a multistage light diffraction device by layering a plurality of light diffraction element units configured as such, a manufacturer of the multistage light diffraction device or an adjusting device configured to automatically carry out adjustment in an in-plane direction can use the three-dimensional alignment marks as a sign to carry out the adjustment of the layered light diffraction element units in the in-plane direction. Further, the manufacturer of the multistage light diffraction device may set the thickness of the three-dimensional alignment mark so as to coincide with the above-described designed interval, so that the interval between the light diffraction element units adjacent to each other in their layering direction substantially coincides with the designed interval. Thus, the first aspect makes it possible not only to carry out the adjustment in the in-plane direction but also to define the interval between the light diffraction element units adjacent to each other in their layering direction.

A light diffraction element unit in accordance with a second aspect of one or more embodiments includes, in addition to the configuration of the light diffraction element unit in accordance with the above-described first aspect, a configuration in which: when the one main surface is viewed in plan view, the three-dimensional alignment mark has an annular shape continuously surrounding the light diffraction element or a substantially annular shape intermittently surrounding the light diffraction element; and when the one main surface is viewed in plan view, the three-dimensional alignment mark has a structure constituted at least by a straight line.

In configuring a multistage light diffraction device by layering a plurality of light diffraction element units configured as such, a manufacturer of the multistage light diffraction device or an adjusting device configured to automatically carry out adjustment in an in-plane direction can use the shapes and the structures each constituted at least by the straight line of the three-dimensional alignment mark to adjust the positions and the orientations in the in-plane direction of the layered light diffraction element units. Thus, the second aspect allows to easily carry out the adjustment in the in-plane direction in configuring the multistage light diffraction device by layering the plurality of light diffraction element units.

A light diffraction element unit in accordance with a third aspect of one or more embodiments includes, in addition to the configuration of the light diffraction element unit in accordance with the above-described second aspect, a configuration in which: the three-dimensional alignment mark includes a thick part, which has a maximum thickness; and the thick part is provided in such a manner as to continuously surround the light diffraction element.

In configuring a multistage light diffraction device by layering a plurality of light diffraction element units configured as such, a light diffraction element is housed in a space surrounded by a substrate on which the light diffraction element is provided, a three-dimensional alignment mark provided on one main surface of the substrate, and another substrate layered over the three-dimensional alignment mark.

Further, with the above-described configuration, the thick part continuously surrounds the light diffraction element. Thus, the space in which the light diffraction element is housed is tightly closed by the two substrates and the three-dimensional alignment mark interposed between the two substrates. Therefore, the third aspect makes it possible to protect the light diffraction element from moisture which can be contained in atmosphere, a shock which can be externally given, and/or the like.

A light diffraction element unit in accordance with a fourth aspect of one or more embodiments includes, in addition to the configuration of the light diffraction element unit in accordance with any one of the above-described first to third aspects, a configuration in which: the three-dimensional alignment mark is made of a material which is optically transparent, and the three-dimensional alignment mark is constituted by a thick part and a thin part, the thick part having a maximum thickness, and the thin part being smaller in thickness than the thick part; and a step exists at a boundary between the thick part and the thin part.

The adjustment in the in-plane direction is carried out on the multistage light diffraction device made of the plurality of layered light diffraction element units in the following manner. That is, microscopic observation is carried out on a three-dimensional alignment mark of a light diffraction element unit which is fixed and a three-dimensional alignment mark of a light diffraction element unit which is to be adjusted, and the three-dimensional alignment marks are made coincide with each other. In doing so, a manufacturer of the multistage light diffraction device or an adjusting device configured to automatically carry out the adjustment in the in-plane direction sets a magnification of the microscope in accordance with the sizes of the light diffraction elements and the three-dimensional alignment marks. Thus, a focal depth of the microscope is automatically determined in accordance with the sizes of the light diffraction elements and the three-dimensional alignment marks.

With the above configuration, even in a case where a sum of the thickness of the substrate and the thickness of the three-dimensional alignment mark is large and this makes it difficult to have a focus on both the three-dimensional alignment marks, it is possible to match the three-dimensional alignment marks by using, as a sign, the step on the outer edge of the thin part.

A light diffraction element unit in accordance with a fifth aspect of one or more embodiments includes, in addition to the configuration of the light diffraction element unit in accordance with any one of the above-described first to fourth aspects, a configuration in which: the three-dimensional alignment mark and the light diffraction element are made of a same material.

As compared to a configuration in which the three-dimensional alignment mark is made of a material which is different from a material of the light diffraction element, the above configuration makes it possible to reduce the cost of the device occurring due to the different materials and to simplify the manufacturing conditions.

A light diffraction element unit in accordance with a sixth aspect of one or more embodiments includes, in addition to the configuration of the light diffraction element unit in accordance with any one of the above-described first to fifth aspects, a configuration in which: the light diffraction element includes a plurality of cells having respective thicknesses or refractive indices set independently of each other.

Examples of the light diffraction element included in the multistage light diffraction device encompass a light diffraction element including a plurality of cells having respective thicknesses or refractive indices set independently of each other.

A light diffraction element unit in accordance with a seventh aspect of one or more embodiments includes, in addition to the configuration of the light diffraction element unit in accordance with the above-described sixth aspect, a configuration in which: the plurality of cells are microcells.

Note here that the term "microcell" refers to, for example, a cell having a cell size of less than 10 µm. The term "cell size" refers to a square root of an area of a cell.

A multistage light diffraction device in accordance with an eighth aspect of one or more embodiments is a multistage light diffraction device including: n (n is an integer of not less than 2) light diffraction element units each of which as recited in any one of the first to seventh aspects and which are layered, a three-dimensional alignment mark of an i-th (i is an integer of 1≤i≤n−1) light diffraction element unit being interposed between a substrate of the i-th light diffraction element unit and a substrate of an i+1-th light diffraction element unit.

A manufacturer of the multistage light diffraction device or an adjusting device configured to automatically carry out adjustment in an in-plane direction can use the three-dimensional alignment marks as a sign to carry out the adjustment in the in-plane direction on the layered light diffraction element units. Further, the manufacturer of the multistage light diffraction device may make the thickness of the three-dimensional alignment mark coincide with the above-described designed interval, so that the interval between the light diffraction element units adjacent to each other in their layering direction substantially coincides with the designed interval. Thus, the seventh aspect allows (i) to carry out the adjustment in the in-plane direction with use of the three-dimensional alignment marks provided to the light diffraction element units and (ii) to define the interval between the adjacent light diffraction element units with use of the three-dimensional alignment marks provided to the light diffraction element units.

A multistage light diffraction device in accordance with a ninth aspect of one or more embodiments includes, in addition to the configuration of the multistage light diffraction device in accordance with the above-described eighth aspect, a configuration in which: when a main surface of a substrate of any of the n light diffraction element units is viewed in plan view, the n light diffraction element units are fixed such that three-dimensional alignment marks respectively provided to the n light diffraction element units overlap each other.

In the multistage light diffraction device, the state in which the three-dimensional alignment marks respectively provided to the light diffraction element units overlap each other means that the adjustment of the positions in the in-plane direction of the light diffraction elements included in the light diffraction element units has been done. Thus, in accordance with the eighth aspect, it is possible to provide the multistage light diffraction device in which the adjustment of the positions in the in-plane direction of the light diffraction elements included in the light diffraction element units has been done.

A method in accordance with a tenth aspect of one or more embodiments for manufacturing a multistage light diffraction device is a method for manufacturing a multistage light diffraction device that includes n (n is an integer of not less than 2) light diffraction element units each of which is as recited in any one of the above-described first to seventh aspects, the method including: a first step of layering an i-th (i is an integer of $1 \leq i \leq n-1$) light diffraction element unit and an i+1-th light diffraction element unit such that a three-dimensional alignment mark of the i-th light diffraction element unit is interposed between a substrate of the i-th light diffraction element unit and a substrate of the i+1-th light diffraction element unit; a second step of adjusting a position of the i+1-th light diffraction element unit relative to the i-th light diffraction element unit such that the three-dimensional alignment mark of the i-th light diffraction element unit overlaps a three-dimensional alignment mark of the i+1-th light diffraction element unit; and a third step of fixing the i+1-th light diffraction element unit to the i-th light diffraction element unit.

With the above configuration, it is possible to provide the multistage light diffraction device in which the interval between the i-th light diffraction element unit and the i+1-th light diffraction element unit adjacent to each other in their layering direction is defined by the three-dimensional alignment marks and the adjustment of the positions in the in-plane direction of the light diffraction elements included in the light diffraction element units has been done.

ADDITIONAL REMARKS

The present invention is not limited to the embodiments, but can be altered by a skilled person in the art within the scope of the claims. The present invention also encompasses, in its technical scope, any embodiment derived by combining technical means disclosed in differing embodiments.

Note that the "light diffraction element" in this specification is an element for converting an optical signal indicative of certain information (for example, a certain image) into an optical signal indicative of other information (for example, another image). Therefore, the "light diffraction element" in this specification can alternatively be referred to as "optical filter", as in a case in which an element for converting an electrical signal indicative of a certain image into an electrical signal indicative of another image is called "filter". In this case, the optical computing system in this specification can be expressed as follows.

A filter unit in accordance with aspect A of one or more embodiments includes: a substrate which is optically transparent; an optical filter provided on one main surface of the substrate; and a three-dimensional alignment mark provided on the one main surface and in a vicinity of the optical filter, the three-dimensional alignment mark being greater in thickness than the optical filter.

A filter unit in accordance with aspect B of one or more embodiments includes, in addition to the configuration of the filter unit in accordance with the above-described aspect A, a configuration in which: when the one main surface is viewed in plan view, the three-dimensional alignment mark has an annular shape continuously surrounding the optical filter or a substantially annular shape intermittently surrounding the optical filter; and when the one main surface is viewed in plan view, the three-dimensional alignment mark has a structure constituted at least by a straight line.

A filter unit in accordance with aspect C of one or more embodiments includes, in addition to the configuration of the filter unit in accordance with the above-described aspect B, a configuration in which: the three-dimensional alignment mark includes a thick part, which has a maximum thickness; and the thick part is provided in such a manner as to continuously surround the optical filter.

A filter unit in accordance with aspect D of one or more embodiments includes, in addition to the configuration of the filter unit in accordance with any one of the above-described aspects A to C, a configuration in which: the three-dimensional alignment mark is made of a material which is optically transparent, and the three-dimensional alignment mark is constituted by a thick part and a thin part, the thick part having a maximum thickness, and the thin part being smaller in thickness than the thick part; and a step exists at a boundary between the thick part and the thin part.

A filter unit in accordance with aspect E of one or more embodiments includes, in addition to the configuration of the filter unit in accordance with any one of the above-described aspects A to D, a configuration in which: the three-dimensional alignment mark and the optical filter are made of a same material.

A filter unit in accordance with aspect F of one or more embodiments includes, in addition to the configuration of the filter unit in accordance with any one of the above-described aspects A to E, a configuration in which: the optical filter includes a plurality of cells having respective refractive indices set independently of each other.

A filter unit in accordance with aspect G of one or more embodiments includes, in addition to the configuration of the filter unit in accordance with the above-described aspect F, a configuration in which: the plurality of cells are microcells.

A multistage optical filter device in accordance with aspect H of one or more embodiments is a multistage optical filter device including: n (n is an integer of not less than 2) filter units each of which is as recited in any one of the above-described aspects A to G and which are layered, a three-dimensional alignment mark of an i-th (i is an integer of $1 \leq i \leq n-1$) filter unit being interposed between a substrate of the i-th filter unit and a substrate of an i+1-th filter unit.

A multistage optical filter device in accordance with aspect I of one or more embodiments includes, in addition to the configuration of the multistage optical filter device in accordance with the above-described aspect H, a configuration in which: when a main surface of a substrate of any of the n filter units is viewed in plan view, the n filter units are fixed such that three-dimensional alignment marks respectively provided to the n filter units overlap each other.

A method in accordance with aspect J of one or more embodiments for manufacturing a multistage optical filter device is a method for manufacturing a multistage optical filter device that includes n (n is an integer of not less than 2) filter units each of which is as recited in any one of the above-described aspects A to G, the method including: a first step of layering an i-th (i is an integer of $1 \leq i \leq n-1$) filter unit and an i+1-th filter unit such that a three-dimensional alignment mark of the i-th filter unit is interposed between a substrate of the i-th filter unit and a substrate of the i+1-th filter unit; a second step of adjusting a position of the i+1-th filter unit relative to the i-th filter unit such that the three-dimensional alignment mark of the i-th filter unit overlaps a three-dimensional alignment mark of the i+1-th filter unit; and a third step of fixing the i+1-th filter unit to the i-th filter unit.

REFERENCE SIGNS LIST

11: multistage light diffraction device
111, 112, 113: light diffraction element unit
11$a$1, 11$a$2, 11$a$3: substrate
11$b$1, 11$b$2, 11$b$3: alignment mark (three-dimensional alignment mark)
11$b$11, 11$b$31: thin part
11$b$12, 11$b$32: thick part
11$b$13, 11$b$33: inner edge
11$b$14, 11$b$34: boundary
11$b$15, 11$b$35: outer edge
11$c$1, 11$c$2, 11$c$3: light diffraction element

The invention claimed is:

1. A light diffraction element unit comprising:
an optically-transparent substrate;
a light diffraction element disposed on a main surface of the optically-transparent substrate; and
a three-dimensional alignment mark disposed on the main surface in a vicinity of the light diffraction element and having a thickness greater than a thickness of the light diffraction element.

2. The light diffraction element unit as set forth in claim 1, wherein when the main surface is viewed in a plan view:
the three-dimensional alignment mark has an annular shape continuously surrounding the light diffraction element or a substantially annular shape intermittently surrounding the light diffraction element, and
the three-dimensional alignment mark has a structure constituted at least by a straight line.

3. The light diffraction element unit as set forth in claim 2, wherein the thickest part of the three-dimensional alignment mark continuously surrounds the light diffraction element.

4. The light diffraction element unit as set forth in claim 1, wherein
the three-dimensional alignment mark is made of an optically-transparent material, and
the three-dimensional alignment mark comprises a step at a boundary between the thickest part and another part of the three-dimensional alignment mark.

5. The light diffraction element unit as set forth in claim 1, wherein the three-dimensional alignment mark and the light diffraction element are made of a same material.

6. The light diffraction element unit as set forth in claim 1, wherein the light diffraction element includes cells having respective thicknesses or refractive indices set independently of each other.

7. The light diffraction element unit as set forth in claim 6, wherein the cells are microcells.

8. A multistage light diffraction device comprising:
n (n is an integer of not less than 2) light diffraction element units which are layered, the n light diffraction element units each comprising:
an optically-transparent substrate;
a light diffraction element disposed on a main surface of the optically-transparent substrate; and
a three-dimensional alignment mark disposed on the main surface in a vicinity of the light diffraction element and having a thickness greater than a thickness of the light diffraction element, wherein
a three-dimensional alignment mark of an i-th (i is an integer of $1 \leq i \leq n-1$) light diffraction element unit is disposed between a substrate of the i-th light diffraction element unit and a substrate of an i+1-th light diffraction element unit.

9. The multistage light diffraction device as set forth in claim 8, wherein when a main surface of a substrate of one of the n light diffraction element units is viewed in the plan view, the n light diffraction element units are fixed such that three-dimensional alignment marks respectively disposed to the n light diffraction element units overlap each other.

10. A method for manufacturing a multistage light diffraction device that includes n (n is an integer of not less than 2) light diffraction element units each including an optically-transparent substrate, a light diffraction element disposed on a main surface of the optically-transparent substrate, and a three-dimensional alignment mark disposed on the main surface in a vicinity of the light diffraction element and having a thickness greater than a thickness of the light diffraction element, the method comprising:
layering an i-th (i is an integer of $1 \leq i \leq n-1$) light diffraction element unit and an i+1-th light diffraction element unit such that a three-dimensional alignment mark of the i-th light diffraction element unit is disposed between a substrate of the i-th light diffraction element unit and a substrate of the i+1-th light diffraction element unit;
adjusting a position of the i+1-th light diffraction element unit relative to the i-th light diffraction element unit such that the three-dimensional alignment mark of the i-th light diffraction element unit overlaps a three-dimensional alignment mark of the i+1-th light diffraction element unit; and
fixing the i+1-th light diffraction element unit to the i-th light diffraction element unit.

* * * * *